United States Patent
Linse et al.

(10) Patent No.: US 11,682,190 B2
(45) Date of Patent: Jun. 20, 2023

(54) METHOD, SYSTEM, AND DEVICE FOR DETECTING AN OBJECT IN A DISTORTED IMAGE

(71) Applicant: Axis AB, Lund (SE)

(72) Inventors: Hampus Linse, Lund (SE); Song Yuan, Lund (SE); Johan Förberg, Lund (SE)

(73) Assignee: Axis AB, Lund (SE)

(*) Notice: Subject to any disclaimer, the term of this patent is extended or adjusted under 35 U.S.C. 154(b) by 108 days.

(21) Appl. No.: 16/839,083

(22) Filed: Apr. 3, 2020

(65) Prior Publication Data

US 2020/0327691 A1    Oct. 15, 2020

(30) Foreign Application Priority Data

Apr. 10, 2019   (EP) .................................. EP19168368

(51) Int. Cl.
*G06V 10/50*   (2022.01)
*G06T 7/73*    (2017.01)
(Continued)

(52) U.S. Cl.
CPC ............... *G06V 10/50* (2022.01); *G06T 5/50* (2013.01); *G06T 7/73* (2017.01); *G06V 10/7515* (2022.01);
(Continued)

(58) Field of Classification Search
None
See application file for complete search history.

(56) References Cited

U.S. PATENT DOCUMENTS

| 9,514,389 | B1 | 12/2016 | Erhan et al. |
| 2007/0065014 | A1 | 3/2007 | Owechko et al. |
| 2016/0217164 | A1* | 7/2016 | Hawkins ................ G06N 20/00 |

FOREIGN PATENT DOCUMENTS

| CN | 106228510 A | * 12/2016 |
| CN | 106504233 A | * 3/2017 |

(Continued)

OTHER PUBLICATIONS

Kristof Van Beeck et al.: "Real-Time Vision-Based Pedestrian Detection in a Truck's Blind Spot Zone Using a Warping Window Approach"; International Conference on Multimedia and Ubiquitous Engineering; Jan. 2014; DOI: 10.1007/978-3-319-03500-0_16.*

(Continued)

*Primary Examiner* — Jiangeng Sun
(74) *Attorney, Agent, or Firm* — Xsensus LLP

(57) ABSTRACT

A method for detecting an object in a first distorted image using a sliding window algorithm, comprising: receiving an inverse of a mathematical representation of a distortion of the first distorted image; wherein the detection of an object comprises sliding a sliding window over the first distorted image, the sliding window comprising a feature detection pattern, and for each position of a plurality of positions in the first distorted image: transforming the sliding window based on the inverse of the mathematical representation of the distortion at the position, wherein the step of transforming the sliding window comprises transforming the feature detection pattern of the sliding window such that a resulting distortion of the feature detection pattern of the transformed sliding window corresponds to the distortion of the first distorted image at the position; and using the transformed sliding window comprising the transformed feature detection pattern in the sliding window algorithm.

20 Claims, 4 Drawing Sheets

(51) Int. Cl.
*G06T 5/50* (2006.01)
*G06V 10/75* (2022.01)
*G06V 10/764* (2022.01)
*G06V 10/82* (2022.01)
*G06V 20/00* (2022.01)

(52) U.S. Cl.
CPC ............ *G06V 10/764* (2022.01); *G06V 10/82* (2022.01); *G06V 20/00* (2022.01); *G06T 2207/20021* (2013.01); *G06T 2207/20081* (2013.01); *G06T 2207/20084* (2013.01); *G06T 2207/20221* (2013.01)

(56) References Cited

FOREIGN PATENT DOCUMENTS

| CN | 107076990 | A | * | 8/2017 | ............... B60J 1/02 |
| CN | 107590438 | A | * | 1/2018 | |
| CN | 108700652 | A | * | 10/2018 | ........... G08B 29/185 |
| CN | 110675307 | A | * | 1/2020 | |
| CN | 111126306 | A | * | 5/2020 | |
| WO | WO-2016104842 | A1 | * | 6/2016 | ............... G06T 7/00 |
| WO | WO-2018138064 | A1 | * | 8/2018 | ......... G06K 9/00805 |
| WO | 2018/232754 | A1 | | 12/2018 | |

OTHER PUBLICATIONS

Beeck, K., et al., "A warping window approach to real-time vision-based pedestrian detection in a truck's blind spot zone," Informatics in Control, Automation and Robotics: 9th International Conference, Rome, Italy, Jan. 2012, 9 pages.

Fremont, V., et al., "Vision-Based People Detection System for Heavy Machine Applications," MDPI journal, Sensors, Jan. 20, 2016, pp. 1-30.

Tateno, K., et al., "Distortion-Aware Convolutional Filters for Dense Prediction in Panoramic Images," Retreived from the Internet URL: http://www.navvis.com/, pp. 1-16.

Zoumpourlis, G., et al., "Non-linear Convolution Filters for CNN-based Learning," Information Technologies Institute, Center for Research and Technology, Hellas, Greece, Aug. 23, 2017, 9 Pages.

Su, Y., and Grauman, K., "Learning Spherical Convolution for Fast Features from 360° C. Imagery," Neural Information Processing Systems (NIPS), 31st Conference, Long Beach, CA, USA, 2017, 11 Pages.

* cited by examiner

METHOD, SYSTEM, AND DEVICE FOR DETECTING AN OBJECT IN A DISTORTED IMAGE

CROSS-REFERENCE TO RELATED APPLICATION

The present application claims priority to EP 19168368.9, filed Apr. 10, 2019, the entire contents of which are incorporated herein by reference.

TECHNICAL FIELD

The present invention relates to a method, a device, and a system for detecting an object in a distorted image.

BACKGROUND OF THE INVENTION

An important field for camera applications is monitoring of a location. In monitoring applications, videos of the monitored location are typically processed using a wide range of different image-processing algorithms. For instance, it is common to implement algorithms which automatically detect motion in the recorded video. Another example of an important feature is object detection in captured images. A typical approach is then to compare the captured images with images in a reference database. As the object-detection algorithm matches features in the captured image and images in the reference database, an object is detected and recognized.

However, there are several issues with such an algorithm. For instance, there are high requirements on the images in the reference database. For example, these images must reflect a wide range of objects, while depicting the objects in an identifiable manner. Objects are therefore typically imaged under different lighting conditions and from a wide range of directions. Thus, it is common for a reference database to contain a large set of reference images.

The captured image, however, is rarely captured under ideal imaging conditions. The captured image may, for instance, suffer from low brightness or be distorted. There are a range of different sources of image distortion, for example the use of wide-angle lenses, such as fish-eye lenses and optical domes, and stitching techniques for providing a panorama image.

Regardless of distortion source(s) and shape of it, a distortion is a challenge when analyzing an image. For example, many object-detection algorithms suffer heavily when applied to distorted images since most algorithms are designed to be applied to non-distorted images. Thus, it becomes computationally intensive for a processor to detect objects in distorted images.

Hence, there exists a need for an improved algorithm for object detection in non-ideal images.

SUMMARY OF THE INVENTION

In view of the above, it is an object of the present inventive concept to eliminate, or at least mitigate one or more of the above-identified deficiencies or problems in the art. In particular, it is an object to provide a method, a system, and a device for detecting an object in a distorted image.

According to a first aspect a method for detecting an object in a first distorted image using a sliding window algorithm is provided. The method comprises: receiving an inverse of a mathematical representation of a distortion of the first distorted image; wherein the detection of an object comprises sliding a sliding window over the first distorted image and for each position of a plurality of positions in the first distorted image: transforming the sliding window based on the inverse of the mathematical representation of the distortion at the position; and using the transformed sliding window in the sliding window algorithm for object detection at the position in the first distorted image.

The wording "distorted image" should, within the context of this application, be construed as an image which has a distorted perspective. In a distorted image, straight lines in the scene are typically curved to some degree. In contrast, a perfectly rectilinear image has perfectly straight lines corresponding to straight lines in a depicted scene. Within the context of this application, two types of distortion sources are discussed: physical distortion sources and digital distortion sources. Non-limiting examples of physical distortion sources are wide-angle lenses, including fish-eye lenses (e.g. f-theta lenses), optical domes and imperfectly rectilinear lenses. Imperfections in a lens may be caused by manufacturing imprecisions. Non-limiting examples of digital distortion sources are image stitching algorithms, for example for producing a panoramic image from a plurality of images. The distortion pattern can be irregular or regular (such as radial distortions). The distortion pattern of a captured image may be the result from one or a combination of distortion sources.

The wording "sliding window algorithm" should, within the context of this application, be construed as an object-detection algorithm that comprises a sliding window. The sliding window is a rectangular region of initially a predetermined width and height that is moved across an image. Image features present in the region defined by the sliding window is compared with a database of reference features in order to detect objects in the image. A feature detection pattern in the sliding window may be based on the database of reference features. The sliding window algorithm may use a plurality of feature detection patterns such that a first sliding window comprises a first feature detection pattern, and a second sliding window comprises a second feature detection pattern, and so on. Thereby, the sliding window algorithm may detect a plurality of different features by using a plurality of different sliding windows and feature detection patterns. The sliding window algorithm may be a convolutional-based algorithm.

The wording "mathematical representation of the distortion" should, within the context of this application, be construed as a mathematical description of an image transform which, when applied to a rectilinear image, results in the distorted image. It is to be understood that the earlier mentioned distortions may be mathematically represented as polynomials, matrices, or lookup tables. For instance, the mathematical representation may be a polynomial/matrix describing a transfer function of a fish-eye lens used when capturing the distorted image. The lookup table may comprise coordinates in the distorted image indexed by coordinates in the rectilinear (or non-distorted) image or vice versa.

By means of the present method, the sliding window algorithm can be used to detect objects in distorted images such as the first distorted image. Thus, image data associated with the first distorted image do not need to be transformed/dewarped prior to object detection using the sliding window algorithm. Thereby, a computational cost relating to image transformation is reduced. For instance, the need to transform a curvilinear image to a rectilinear image prior to object detection may be reduced or removed completely.

Reducing a need for image transformation may thereby reduce any unnecessary image cropping related to such image transformations. Thus, image features in regions which would be removed due to image cropping may be included in the sliding window algorithm, and objects present in such regions may thereby be detected.

Further, since the first distorted image does not need to be transformed/dewarped, image data associated with the first distorted image do not need to be interpolated. Thereby, a computational cost associated with the sliding window algorithm may be reduced, since the sliding window algorithm does not need to include image data generated in image interpolation. Interpolated image data do not comprise additional information which is not already present in the image data associated with the captured image, thus including image data generated in image interpolation in the sliding window algorithm only increases a computational cost without a corresponding increase in actual image information.

Furthermore, since the first distorted image does not need to be transformed, the present method can be performed early in an image processing pipeline. Performing the present method, and thereby detecting objects, early in the image processing pipeline may allow for using the detected objects as inputs for subsequent steps in the image processing pipeline without delaying the subsequent steps in the image processing pipeline, thereby allowing for a shorter processing time related to the image processing pipeline. For example, the detected objects may be used as inputs for calculating encoder settings for a video stream formed by the image processing pipeline, and/or for drawing overlays, such as bounding boxes, in the video stream formed by the image processing pipeline. A further advantage associated with detecting objects early in the image processing pipeline is that, for an analytics camera used only for detecting objects, subsequent steps in the image processing pipeline may not need to be performed. Thus, since there may be no need for the analytics camera to output a video stream, a power consumption of the analytics camera may thereby be reduced.

The step of transforming the sliding window may comprise transforming a feature detection pattern of the sliding window.

The wording "feature detection pattern" should, within the context of this application, be construed as a pattern which the sliding window algorithm uses to detect a specific feature. It is to be understood that the sliding window algorithm may comprise a plurality of different feature detection patterns. For example, a feature detection pattern may be used for detecting edges in the image frame having various angles. The feature detection pattern may also be used for detecting a person, a specific face of a person, or other objects such as a car, dog, etc., in the image frame.

The feature detection pattern may be transformed based on the inverse of the mathematical representation of the distortion at the position of the sliding window.

An advantage of transforming the feature detection pattern of the sliding window is that distorted features in the first distorted image may be detected. Thereby, the sliding window algorithm may detect distorted objects in the first distorted image.

A further advantage of transforming the feature detection pattern of the sliding window is that the feature detection pattern may be adapted to a spatial resolution of the first distorted image, as the spatial resolution of the first distorted image may vary across the first distorted image. For instance, in regions of low spatial resolution, a coarser feature detection pattern may be used in the sliding window algorithm, and thereby reducing a computational cost associated with the sliding window algorithm.

The wording "spatial resolution" should, within the context of this application, be understood as a spatial resolution for an image frame. In a distorted image, acquired through e.g. a wide-angle lens or stitched from multiple image frames, different areas of the image have different spatial resolution. In other words, equally sized areas of the image frame cover differently sized angles of the camera's field of view (FOV). The spatial resolution may be specified on a pixel level for an image frame, or can be determined on a pixel sub-group level, e.g. on a macroblock level. Spatial resolution may be expressed as number of pixels per FOV angle, or as amount of FOV angle per pixel. The skilled person is familiar with how to interchange between these expressions depending on application. For example, in an implementation of a method according to the present application, one of these expressions may be preferred to use. A spatial resolution distribution may be represented by e.g. a table indicating the spatial resolution distribution for pixels or pixel sub-groups, e.g. for macroblocks.

The step of transforming the sliding window may comprise transforming a size of the sliding window.

The size of the sliding window may be transformed based on the inverse of the mathematical representation of the distortion at the position of the sliding window. It is to be understood that the height of the sliding window may be transformed independently from the width of the sliding window.

An advantage of transforming the size of the sliding window is that the size of the sliding window may be adapted to the spatial resolution of the first distorted image, as the spatial resolution of the first distorted image may vary across the first distorted image. Thereby, a computational cost associated with the size of the sliding window may be reduced.

The method may further comprise: using the transformed sliding windows as kernels in a first layer of a convolutional neural network.

The wording "convolutional neural network" should, within the context of this application, be construed as an algorithm used for image classification. The algorithm may be trained prior to using it for object detection. This training results in a database of convolutional filters related to specific image features. When the convolutional neural network is used for object detection, a plurality of convolutions is performed on an input image, where each convolution in the plurality of convolutions uses different convolutional filters. In other words, the first layer is a convolutional layer applying a convolution operation (using the transformed kernels) to the input (image data of the image frame), passing the result to the next layer. Each convolution results in an image feature map associated with the convolutional filter. The feature maps resulting from the plurality of convolutions are then used to form a final output. The final output may then be used to detect an object in the input image.

An advantage associated with using the transformed sliding windows as kernels in a first layer of a convolutional neural network is that an image transformation of the first distorted image may not be needed. Thereby, a computational cost associated with image transformations may be reduced.

The method may further comprise: storing the transformed sliding window for each position of the plurality of positions in the first distorted image.

An advantage associated with storing the transformed sliding window for each position of the plurality of positions in the first distorted image is that the transformed sliding window may be used at a later time. For instance, the transformed sliding window may be used for additional computations later in the image processing pipeline. Since the distortion is the same between images, there is no need to transform the feature detection pattern in and/or size of the sliding window for each image frame. Storing the transformed sliding window for each position of the plurality of positions in the first distorted image thereby facilitates reuse of the transformed sliding windows in object detection in other distorted images captured in the same manner as the first distorted image, which in turn may decrease computational time and computational costs associated with object detection in multiple distorted images.

The transformed sliding window may be stored in a lookup table indexed by the position of the plurality of positions in the first distorted image.

An advantage associated with storing the transformed sliding window in a lookup table indexed by the position of the plurality of positions in the first distorted image is that it may allow for a simplified retrieval of the transformed sliding window, and thereby reduce associated computational costs.

In case the method is performed on a plurality of distorted images, the detection of an object in each of the plurality of distorted images may comprise using the transformed sliding windows used for object detection in the first distorted image.

As the transformation of the sliding window may be performed once for the plurality of distorted images, the computational cost associated with the transformation of the sliding window may be reduced as the sliding window does not need to be transformed for each distorted image in the plurality of distorted images.

Further, as the transformation of the sliding window may be performed for one distorted image in the plurality of distorted images, the computational cost may be reduced compared to transformation of each distorted image in the plurality of distorted images as in prior art system. In other words, the computational cost related to object detection in a plurality of distorted images may be reduced by the present method.

The method may further comprise encoding the plurality of transformed images to a transformed video stream.

The distortion may comprise an optical distortion. The optical distortion may comprise a barrel distortion, a pincushion distortion, and/or a mustache distortion. The optical distortion may comprise a misalignment between an optical axis of imaging optics and an image sensor. The optical distortion may comprise a tangential distortion.

The distortion may comprise an image transform applied to image data, thereby forming the distorted images.

The image transform may comprise an image filter. The image transform may comprise an image stitching. A plurality of primary images may be stitched to form panoramic images. The distorted images may be the formed panoramic images. A skilled person realizes that the formed panoramic images may comprise distorted features as a result of the image stitching.

An advantage associated with the distortion comprising an image transform applied to image data, thereby forming the distorted images is that the distorted image associated with the image data may be filtered prior to applying the sliding window algorithm for object detection. Thereby, certain features present in the image data may be reduced or removed prior to object detection.

An advantage associated with the distortion comprising an image stitching is that it may allow the present method to detect objects in panoramic images.

The step of transforming the sliding window may be hardware implemented. For example, the transformation of feature detection patterns may advantageously be performed in hardware such as a graphical processing unit (GPU).

According to a second aspect, a computer program product is provided. The computer program product comprises a computer-readable storage medium with instructions adapter to carry out the present method when executed by a device having processing capabilities.

The computer-readable storage medium may be a non-transitory computer-readable storage medium.

The above mentioned features of the method, when applicable, apply to this second aspect as well. In order to avoid undue repetition, reference is made to the above.

According to a third aspect, a device arranged for detecting an object in a first distorted image using a sliding window algorithm is provided. The device comprises: an image receiver arranged for receiving the first distorted image; a distortion receiver arranged for receiving an inverse of a mathematical representation of a distortion of the first distorted image; and at least one processor arranged to: slide a sliding window over a plurality of positions in the first distorted image, and for each position of a plurality of positions in the first distorted image: transform the sliding window based on the inverse of the mathematical representation of the distortion at the position; and use the transformed sliding window in the sliding window algorithm for object detection at the position in the first distorted image.

The above mentioned features of the method and/or the computer program product, when applicable, apply to this third aspect as well. In order to avoid undue repetition, reference is made to the above.

The device may further comprise a non-transitory storage medium configured for storing the transformed sliding window for each position of the plurality of positions in the distorted image.

The device may be a camera.

According to a fourth aspect, a system arranged for detecting an object in a distorted image using a sliding window algorithm is provided. The system comprises: a camera arranged for capturing distorted images of a scene; and the present device; wherein the image receiver of the device is arranged for receiving the distorted images of the scene captured by the camera.

The above mentioned features of the method, the computer program product, and/or the device, when applicable, apply to this fourth aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

It can be problematic to detect objects in distorted images as features are warped in the image. A solution is therefore to dewarp the distorted images prior to applying an object-detection algorithm. Dewarping is a process to reverse a distorted image into a linearly projected image, for which the object-detection algorithm works better. However, dewarping is by itself a very computationally heavy operation which burdens the processor and also takes up valuable resources, such as time, power, and bandwidth, in, for instance, the processor. Moreover, dewarping burdens the scaler unit in the camera system which is a limited resource and thus other processes also needing access to the scaler may suffer.

The inventors have realized that by transforming a sliding window in a sliding window algorithm, objects may be detected directly in distorted images. Thus, with the present inventive concept, it is not necessary to dewarp distorted images prior to applying the sliding window algorithm for object detection. The present inventive concept will now be described with reference to FIG. 1-FIG. 4.

Figure 1A:
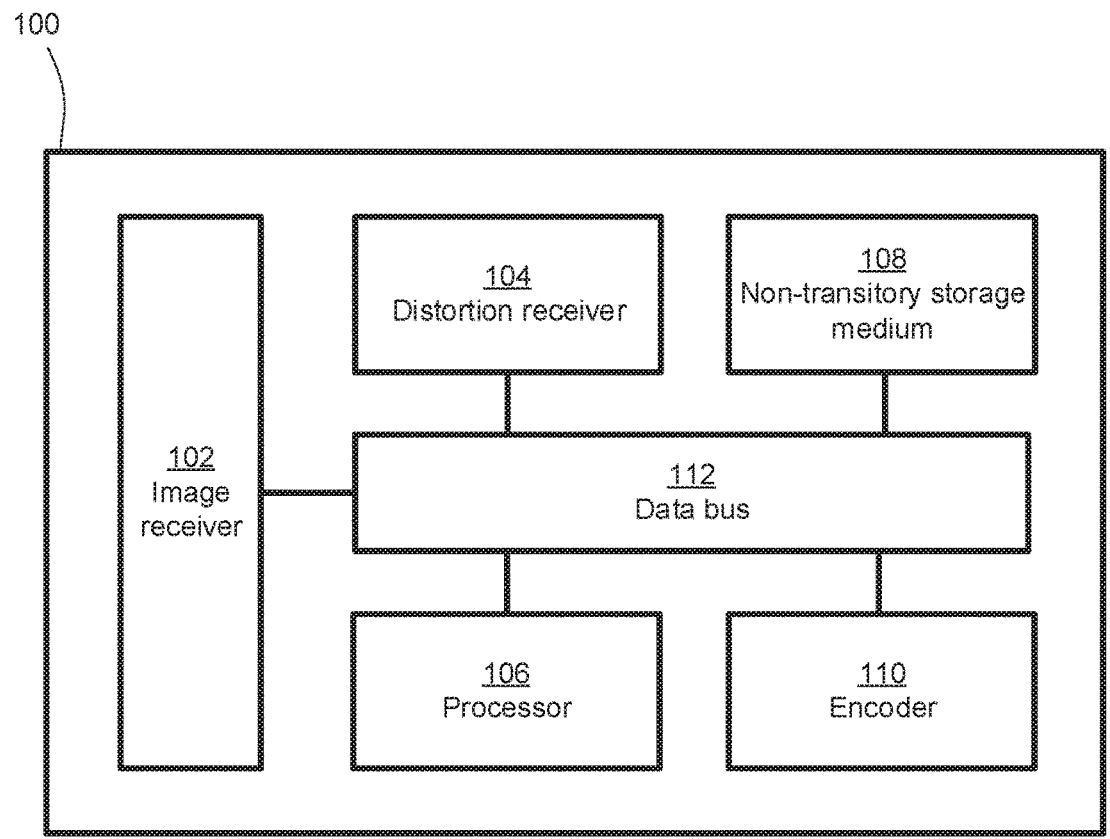
FIG. 1A illustrates device arranged for detecting an object in a distorted image using a sliding window algorithm.
Figure 1B:
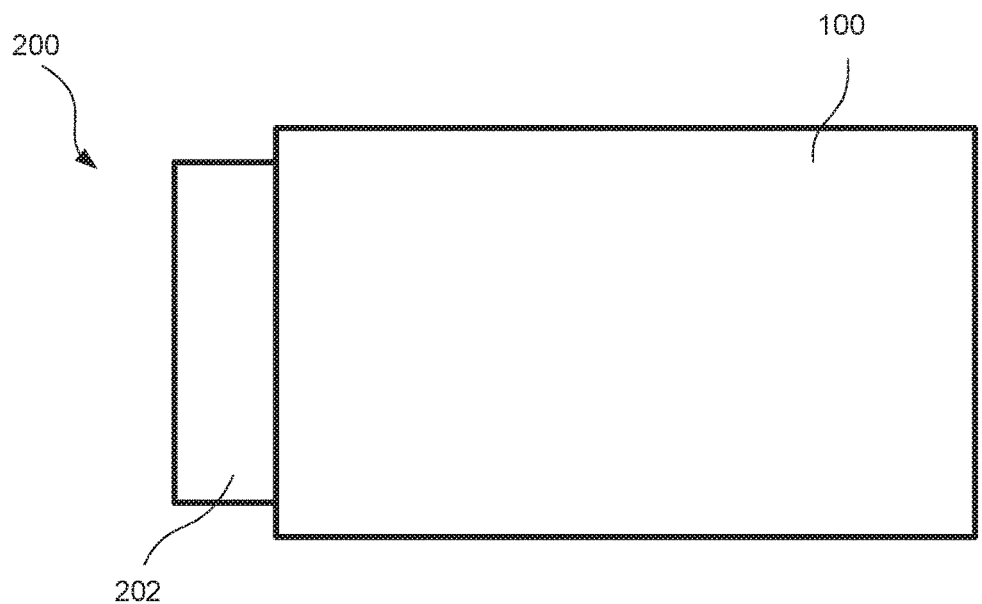
FIG. 1B illustrates a camera.

FIG. 1A-1B illustrate a device 100 arranged for detecting an object in a first distorted image 600 using a sliding window algorithm. Functionality of the device will now be explained in conjunction with FIG. 2A-2C.

The device 100 comprises an image receiver 102. The image receiver 102 is arranged for receiving the first distorted image (see FIG. 2B below, reference 600). The first distorted image 600 may be a frame in a video stream. The image receiver 102 may be arranged to receive image data from an image sensor. The image receiver 102 may be an image sensor.

The device 100 further comprises a distortion receiver 104. The distortion receiver 104 is arranged for receiving an inverse of a mathematical representation of a distortion of the first distorted image 600. The distortion may comprise an optical distortion. The optical distortion may be determined using a collimator. The distortion may be determined based on a distorted image of a known planar target. A known planar target may comprise a varying and/or repeating pattern. For example, the known planar target may comprise a repeating pattern of known geometry. The repeating pattern may be a chessboard-like pattern.

The distortion may comprise an image transform applied to image data, thereby forming the distorted images. The image transform may be associated with a stitching of images for forming a panoramic image. In some variants, the distortion is a combination of an optical distortion and an image transform applied to the captured image data.

The image receiver 102 and the distortion receiver 104 may be a single receiver.

The device 100 further comprises at least one processor 106. The at least one processor 106 is arranged to slide a sliding window 620 over a plurality of positions in the first distorted image 600, and for each position 630, 634, 638 of a plurality of positions in the first distorted image 600: transform the sliding window 620 based on the inverse of the mathematical representation of the distortion at the position 630, 634, 638; and use the transformed sliding window 720, 724, 728 in the sliding window algorithm for object detection at the position 630, 634, 638 in the first distorted image 600. The sliding window 620 may comprise a feature detection pattern 700.

A plurality of feature detection patterns may be received from a server (not shown in the figures) in communication with the device 100 or stored in the device 100. The plurality of feature detection patterns may be predetermined by a training process. The training process may use a plurality of images comprising features of interest. The training process may use a plurality of images not comprising the features of interest. For example, the training process may use a plurality of images comprising cars and a plurality of images not comprising cars.

The training process may comprise an optimization technique to determine kernels for a convolutional neural network (CNN) which will best match the features of interest. In a CNN, the first layer is always a convolutional layer using a sliding window algorithm and a set of defined kernels. In a typical CNN scenario, each convolutional layer has its own set of convolution kernels for which weights should be trained based on the object detection scenario of the CNN (features of interest, e.g. cars, humans, etc.). As described above, for a distorted image, the defined kernels may not always be sufficient. Using the inventive concept described herein, the feature detection pattern and/or the sizes of the set of kernels of a convolutional layer of the CNN may be transformed based on the inverse of the mathematical representation of the distortion and the position in the distorted image. Consequently, the distorted images may be used as input to the CNN, and the kernels of the CNN, in particular the kernels of the first layer but additionally/alternatively also for other convolutional layers of the CNN, may be transformed instead.

The at least one processor 106 may be further arranged to stitch images received from e.g. the image sensor of a camera for forming a panoramic image. The first distorted image 600 may be the formed panoramic image.

The device 100 may further comprise a non-transitory storage medium 108 as exemplified in FIG. 1A. The non-transitory storage medium 108 may be configured for storing the transformed sliding window 720, 724, 728 for each position 630, 634, 638 of the plurality of positions in the first distorted image 600. The non-transitory storage medium 108 may be further configured to store distorted images received by the image receiver 102. The non-transitory storage medium 108 may be further configured to store the distortion and/or the inverse of the distortion related to a specific camera and/or camera model. In case, the distortion is stored in the storage medium 108, the at least one processor 106 may be employed for calculating the inverse of the distortion. The non-transitory storage medium 108 may be further configured to store a plurality of feature detection patterns.

The device 100 may further comprise an encoder 110 as exemplified in FIG. 1A. The encoder 110 may be arranged for encoding transformed images to a further video stream. The non-transitory storage medium 108 may be further configured to store the further video stream.

The device 100 may comprise a data bus 112 as exemplified in FIG. 1A. The image receiver 102, the distortion receiver 104, the at least one processor 106, the non-transitory storage medium 108, and/or the encoder 110 may communicate via the data bus 112.

The device 100 may be a camera 200, as exemplified in FIG. 1B. The camera 200 may comprise optics 202 as exemplified in FIG. 1B. The optics 202 may be imaging optics. The imaging optics may be a camera objective. The optics may image a scene 500. The device 100 may be arranged to produce a panoramic image of the scene 500. The at least one processor 106 may be further arranged to stitch images to form a panoramic image of the scene 500.

Figure 2A:
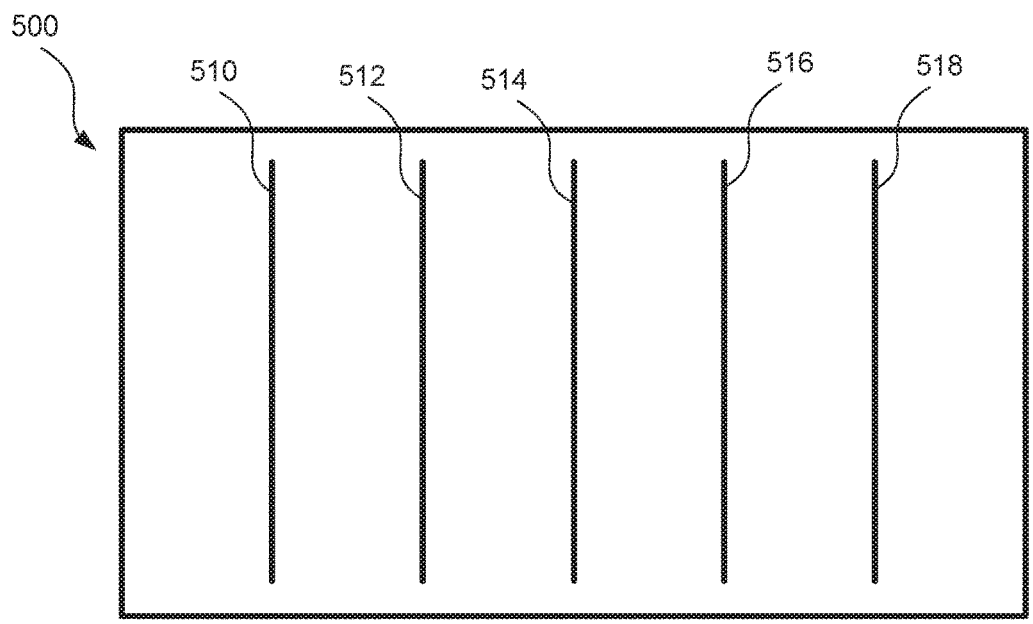
FIG. 2A illustrates a scene comprising straight lines.
Figure 2B:
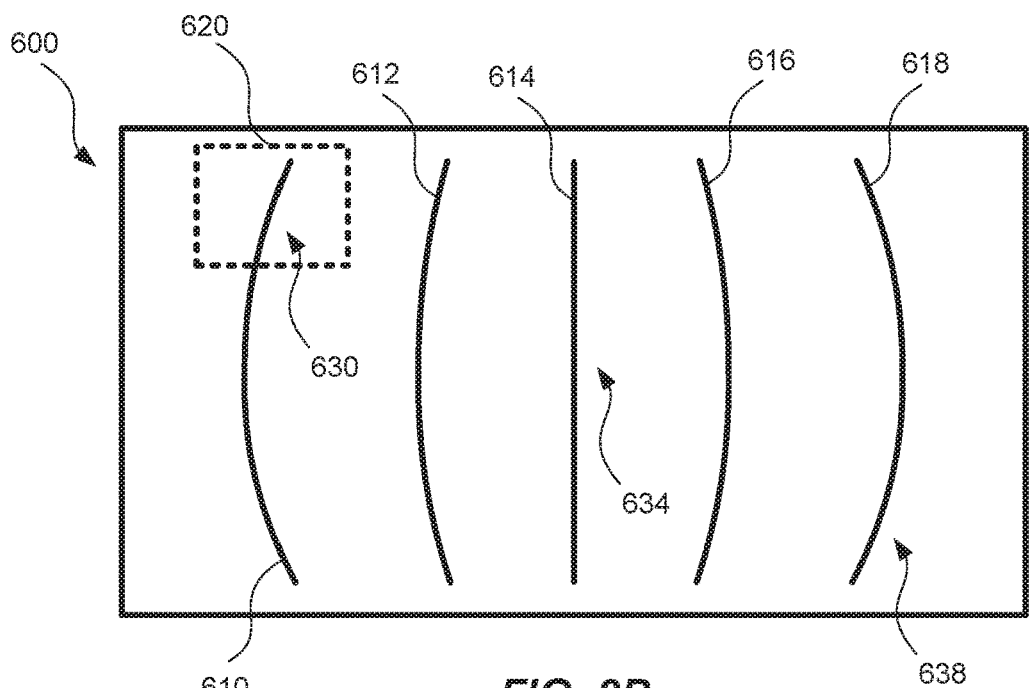
FIG. 2B illustrates a distorted image of the scene in FIG. 2A.

The present inventive concept will now be further described with reference to FIG. 2A-FIG. 2C. FIG. 2A illustrates a scene 500 comprising a plurality straight lines 510, 512, 514, 516, 518. A rectilinear image of the scene 500 would reproduce the straight lines 510, 512, 514, 516, 518. However, images are often distorted, which is exemplified as a barrel distortion in FIG. 2B. FIG. 2B illustrates a distorted image 600 of the scene 500 in FIG. 2A. As is exemplified in FIG. 2B, the straight lines 510, 512, 514, 516, 518 in the scene 500 appear as bent lines 610, 612, 614, 616, 618 in the distorted image 600. As is exemplified in the distorted image 600, the distortion varies across the distorted image 600. For instance, near the center of the distorted image 600, the straight line 514 in the scene 500 is imaged as a straight line 614 in the distorted image 600. Near the edges of the distorted image 600, the straight lines 510, 518 in the scene 500 are imaged as bent lines 610, 618 in the distorted image 600. In other words, for the distortion exemplified in FIG. 2B, the distortion is smaller in the center of the distorted image 600 and larger towards the edges of the distorted image 600. Thus, a degree and shape of the distortion depends on the distortion itself and on a position 630, 634, 638 in the distorted image 600.

In FIG. 2B, a sliding window 620 is shown. In order to correctly identify features in the distorted image 600, a feature detection pattern 700 may be transformed based on an inverse of the distortion and on the position 630, 634, 638 in the distorted image 600. In the example shown in FIG. 2C, the feature detection pattern 700 is associated with a straight line. Applying the feature detection pattern 700 directly to the distorted image 600 would, for example, fail to correctly detect features relating to straight lines at a first position 630 and at a third position 638 in the distorted image 600. However, applying the feature detection pattern 700 directly to the distorted image 600 would, for example, correctly detect the features relating to straight lines at a second position 634 in the distorted image 600. Thus, in order for the sliding window algorithm to correctly identify features relating to the feature detection pattern 700, the sliding window 620 may be transformed based on an inverse of the distortion for each position 630, 634, 638 in the distorted image 600. This is exemplified by the three transformed sliding windows 720, 724, 728 comprising transformed feature detection patterns in FIG. 2C for the three different positions 630, 634, 638 in the distorted image 600. Thereby, applying the transformed sliding windows 720, 724, 728 in the sliding window algorithm to the distorted image 600 would correctly identify features relating to the feature detection pattern 700 for each position 630, 634, 638 in the distorted image 600.

Figure 2C:
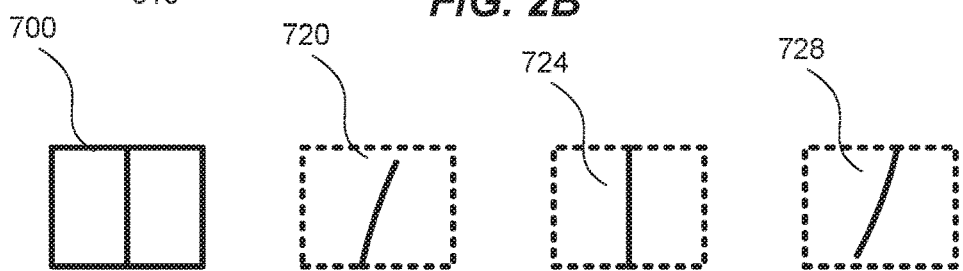
FIG. 2C illustrates a feature detection pattern and a plurality of transformed sliding windows.

It is to be understood that the straight lines 510, 512, 514, 516, 518 in the scene 500 illustrates in FIG. 2A, the optical distortion in FIG. 2B, and feature detection pattern 700 in FIG. 2C are examples only, and that they are described here in order to explain the present inventive concept. It is to be understood that the present inventive concept may be explained using different image features, e.g. real-world objects, and different distortions, e.g. pincushion distortion, mustache distortion, and/or image stitching.

Figure 3:
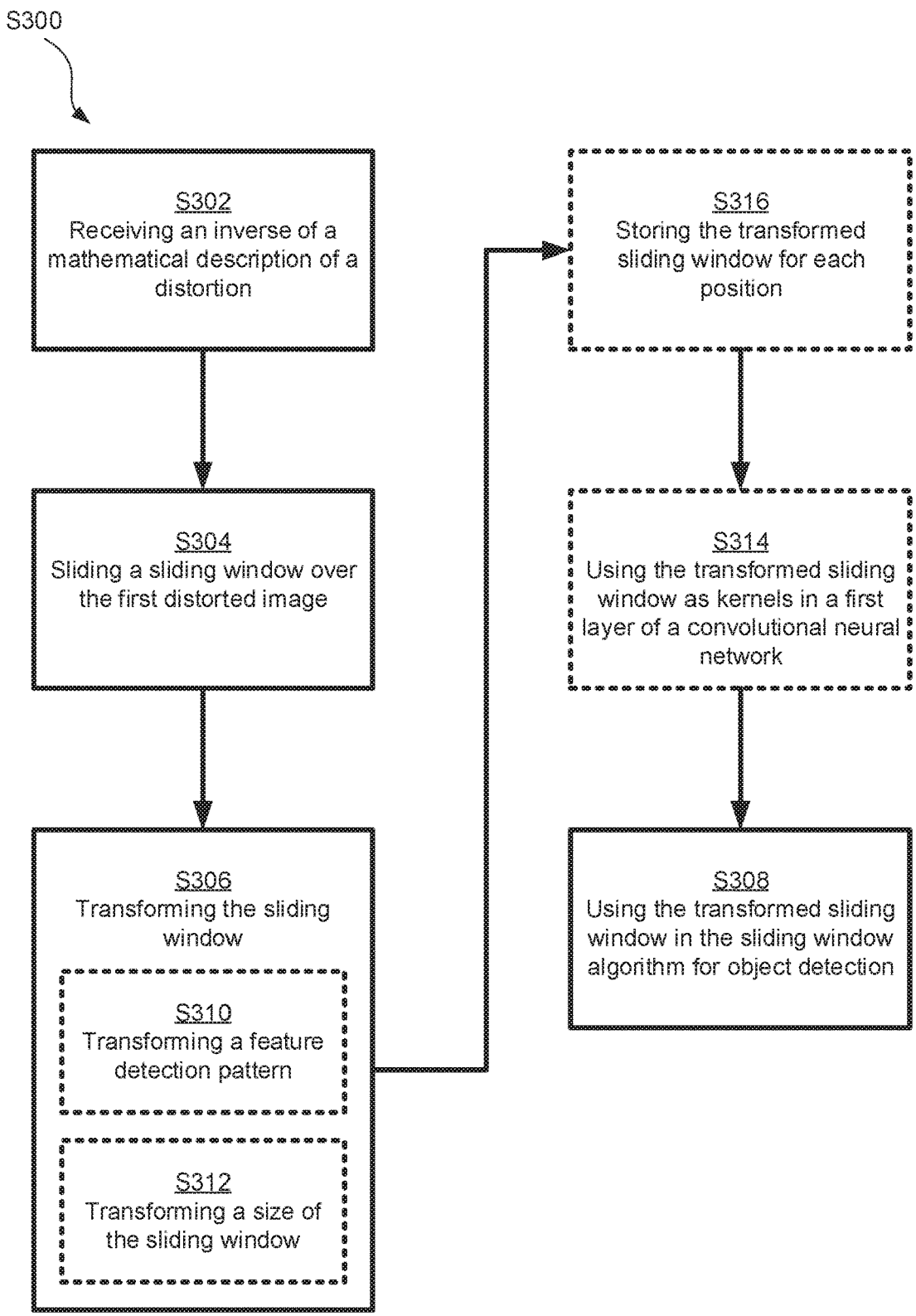
FIG. 3 is a block scheme of a method for detecting an object in a first distorted image using a sliding window algorithm.

FIG. 3 is a block scheme of a method S300 for detecting an object in a first distorted image 600 using a sliding window algorithm. The method S300 comprises receiving S302 an inverse of a mathematical representation of a distortion of the first distorted image 600.

The distortion may comprise an optical distortion. The optical distortion may comprise a barrel distortion, a pincushion distortion, and/or a mustache distortion. The optical distortion may comprise a misalignment between an optical axis of imaging optics and an image sensor.

The distortion may comprise an image transform applied to image data, thereby forming the distorted images. The image transform may comprise an image stitching. The image stitching may stitch a plurality of primary images to form a panoramic image. The distorted image may be a panoramic image.

It is to be understood that the distorted image may comprise an optical distortion and an image transform applied to image data.

The detection of an object comprises sliding S304 a sliding window 620 over the first distorted image 600 and for each position 630, 634, 638 of a plurality of positions in the first distorted image 600: transforming S306 the sliding window 620 based on the inverse of the mathematical representation of the distortion at the position 630, 634, 638, and using S308 the transformed sliding window 720, 724, 728 in the sliding window algorithm for object detection at the position 630, 634, 638 in the first distorted image 600.

The step of transforming S306 the sliding window 620 may comprise transforming S310 a feature detection pattern 700 of the sliding window 620.

The step of transforming S306 the sliding window 620 may comprise transforming S312 a size of the sliding window 620.

The step of transforming S306 the sliding window 620 may be hardware implemented. The step of transforming S306 the sliding window 620 may be implemented in an application-specific integrated circuit (ASIC). The step of transforming S306 the sliding window 620 may in other variants be implemented in software in the at least one processor 106 of the device 100.

The transformed sliding window 720, 724, 728 may be stored in a lookup table indexed by the position 630, 634, 638 of the plurality of positions in the first distorted image 600.

The method S300 may further comprise: using S314 the transformed sliding windows 720, 724, 728 as kernels in a first layer of a convolutional neural network.

The method S300 may further comprise: storing S316 the transformed sliding window 720, 724, 728 for each position 630, 634, 638 of the plurality of positions in the first distorted image 600.

In case the method S300 is performed on a plurality of distorted images, the detection of an object in each of the plurality of distorted images may comprise using the transformed sliding windows 720, 724, 728 used for object detection in the first distorted image 600. The plurality of distorted images may be a video stream. The method S300 may further comprise encoding the plurality of transformed images to a transformed video stream.

Figure 4:
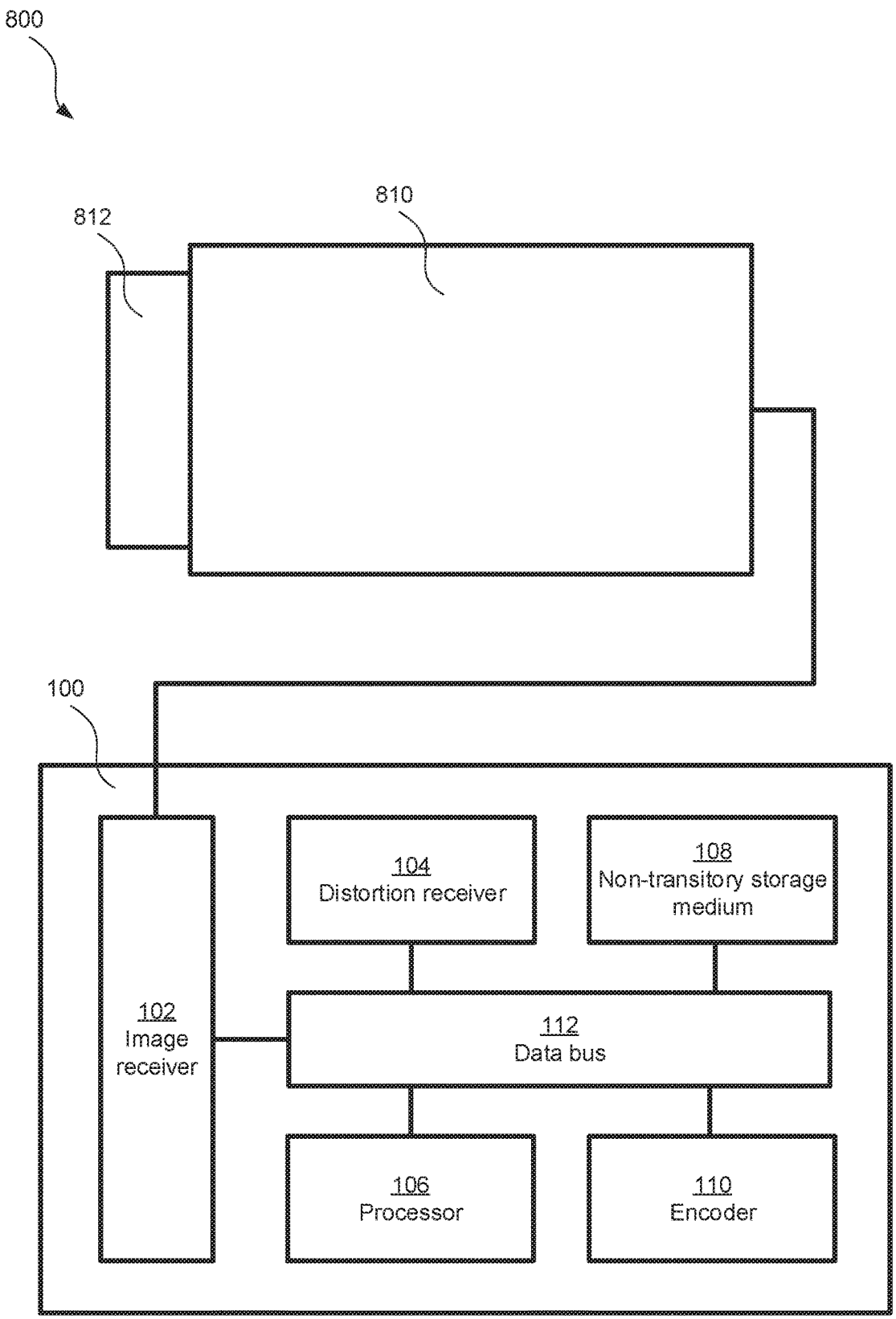
FIG. 4 illustrates a system arranged for detecting an object in a distorted image.

FIG. 4 illustrates a system 800 arranged for detecting an object in a distorted image using a sliding window algorithm. The system 800 comprises: a camera 810 arranged for capturing distorted images of a scene 500; and the present device 100; wherein the image receiver 102 of the device 100 is arranged for receiving the distorted images of the scene 500 (FIG. 2A) captured by the camera 810. The camera 810 may comprise imaging optics 812. The image receiver 102 of the device 100 may be arranged for receiving the distorted images of the scene 500 via a wired or wireless communication interface. The distorted image may be the first distorted image 600. The system 800 may comprise a plurality of cameras arranged to produce a panoramic image of a scene 500. The system 800 may be mounted in a single assembly.

The person skilled in the art realizes that the present inventive concept by no means is limited to the preferred variants described above. On the contrary, many modifications and variations are possible within the scope of the appended claims.

Additionally, variations to the disclosed variants can be understood and effected by the skilled person in practicing the claimed invention, from a study of the drawings, the disclosure, and the appended claims.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. For example, the transforming of the sliding window may be implemented in a GPU or an Application Specific Integrated Circuit, ASIC, while running the sliding window algorithm with the transformed sliding windows may be implemented in software run on a Central Processing Unit, CPU, of the device.

The invention claimed is:

1. A method for detecting an object in a single image of a scene, the single image being distorted by a predetermined distortion, the method comprising:
   receiving the single image of the scene;
   receiving an inverse function of a mathematical representation of the predetermined distortion,
   wherein the mathematical representation of the predetermined distortion is an image transform which, when applied to a rectilinear image corresponding to the scene, results in the single image that is distorted by the predetermined distortion; and
   detecting the object in the single image, wherein the detecting the object in the single image comprises:
   sliding a sliding window over a plurality of positions in the single image that is distorted by the predetermined distortion, the sliding window comprising a feature detection pattern; and
   for each position of the plurality of positions in the single image, transforming the sliding window based on a position-specific value of the inverse function of the mathematical representation of the predetermined distortion,
   wherein the transforming the sliding window at each position of the plurality of positions in the single image comprises transforming the feature detection pattern of the sliding window such that resulting position-specific distortions of the feature detection pattern of the transformed sliding window corresponds to position-specific portions of the predetermined distortion such that the object is detected in the single image based on at least one of the position-specific distortions.

2. The method according to claim 1, wherein the step of transforming the sliding window comprises transforming a size of the sliding window.

3. The method according to claim 1, the method further comprising:
   storing the transformed sliding window for each position of the plurality of positions.

4. The method according to claim 3, wherein the transformed sliding window is stored in a lookup table indexed by positions of the plurality of positions.

5. The method according to claim 1, further comprising:
   receiving a second single image of the scene, the second single image being received after the single image of the scene is received and being distorted by the predetermined distortion; and
   detecting the object in the second single image, wherein the detecting the object in the second single image comprises:
   sliding the sliding window, that comprises the feature detection pattern, in the second single image over the plurality of positions; and
   for each position of the plurality of positions in the second single image, transforming the sliding window based on the position-specific value of the inverse function of the mathematical representation of the predetermined distortion,
   wherein the transforming the sliding window at each position of the plurality of positions in the second single image comprises transforming the feature detection pattern of the sliding window such that resulting position-specific distortions of the feature detection pattern of the transformed sliding window corresponds to the predetermined distortion such that the object is detected in the second single image based on at least one of the position-specific distortions.

6. The method according to claim 1, wherein the distortion comprises an image transform applied to image data.

7. The method according to claim 1, wherein the step of transforming the sliding window is hardware implemented.

8. A non-transitory computer-readable storage medium with instructions configured to cause a device that includes a processor to carry out the method of claim 1.

9. A device configured to detect an object in a single image of a scene, the single image being distorted by a predetermined distortion, the device comprising:
 a receiver configured to receive the single image of the scene; and
 at least one processor configured to:
  receive an inverse function of a mathematical representation of the predetermined distortion,
  wherein the mathematical representation of the predetermined distortion is an image transform which, when applied to a rectilinear image corresponding to the scene, results in the single image that is distorted by the predetermined distortion; and
  detect the object in the single image, wherein the detecting the object in the single image comprises:
  slide a sliding window over a plurality of positions in the single image that is distorted by the predetermined distortion, the sliding window comprising a feature detection pattern; and
  for each position of the plurality of positions in the single image, transform the sliding window based on a position-specific value of the inverse function of the mathematical representation of the predetermined distortion,
  wherein the transforming the sliding window at each position of the plurality of positions in the single image comprises transforming the feature detection pattern of the sliding window such that resulting position-specific distortions of the feature detection pattern of the transformed sliding window corresponds to position-specific portions of the predetermined distortion such that the object is detected in the single image based on at least one of the position-specific distortions.

10. The device according to claim 9, further comprising a non-transitory storage medium configured to store at least one of:
 values corresponding to the inverse function of the mathematical representation of the predetermined distortion, or
 the position-specific values of the inverse function of the mathematical representation of the predetermined distortion, or
 position-specific values of the transformed sliding window.

11. The device according to claim 9, wherein the device is a camera.

12. A system for image processing, the system comprising:
 a camera; and
 a device according to claim 9;
 wherein the receiver of the device is configured to receive the single image of the scene from the camera.

13. The device according to claim 9, wherein, for each position of the plurality of positions, values corresponding to the transformed sliding window are stored in a lookup table that is indexed by position.

14. The method according to claim 1, further comprising:
 storing the inverse function of the mathematical representation of the predetermined distortion,
 wherein the stored inverse function of the mathematical representation of the predetermined distortion is related to a specific camera or camera model.

15. The method according to claim 1, wherein the inverse function of the mathematical representation of the predetermined distortion is represented as a polynomial.

16. The method according to claim 1, wherein the inverse function of the mathematical representation of the predetermined distortion is represented as a matrix.

17. The method according to claim 1, wherein the inverse function of the mathematical representation of the predetermined distortion is represented as a lookup table.

18. The method according to claim 1, wherein the sliding the sliding window in the single image that is distorted by the predetermined distortion comprises sliding the sliding window in a predetermined direction.

19. The method according to claim 1, wherein the plurality of positions in the single image over which the sliding window is sliding comprise at least one predetermined position.

20. A method for detecting an object in a single image of a scene, the single image being distorted by a predetermined distortion, the method comprising:
 receiving the single image of the scene; and
 detecting the object in the single image, wherein the detecting in the single image the object comprises:
  sliding a sliding window over a plurality of positions in the single image that is distorted by the predetermined distortion, the sliding window comprising a feature detection pattern; and
  for each position of the plurality of positions in the single image, transforming the sliding window based on a position-specific value of the inverse function of the mathematical representation of the predetermined distortion,
  wherein the mathematical representation of the predetermined distortion is an image transform which, when applied to a rectilinear image corresponding to the scene, results in the single image that is distorted by the predetermined distortion;
  wherein the transforming the sliding window at each position of the plurality of positions in the single image comprises transforming the feature detection pattern of the sliding window such that resulting position-specific distortions of the feature detection pattern of the transformed sliding window corresponds to position-specific portions of the predetermined distortion such that the object is detected in the single image based on at least one of the position-specific distortions.

* * * * *